United States Patent
Kim

(10) Patent No.: US 8,492,642 B2
(45) Date of Patent: Jul. 23, 2013

(54) SYSTEM FOR CONTROLLING TEMPERATURE OF A SECONDARY BATTERY MODULE

(75) Inventor: Tae-Yong Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1067 days.

(21) Appl. No.: 11/231,652

(22) Filed: Sep. 20, 2005

(65) Prior Publication Data
US 2006/0060236 A1    Mar. 23, 2006

(30) Foreign Application Priority Data
Sep. 23, 2004 (KR) .................. 10-2004-0076439

(51) Int. Cl.
*H01L 35/30* (2006.01)

(52) U.S. Cl.
USPC ........... 136/205; 136/200; 136/203; 136/201; 136/202

(58) Field of Classification Search
USPC ............... 136/200–242; 429/62, 71, 120
See application file for complete search history.

(56) References Cited

U.S. PATENT DOCUMENTS

| | | | | |
|---|---|---|---|---|
| 3,269,873 | A | * | 8/1966 | Dent ........................... 136/208 |
| 4,253,515 | A | * | 3/1981 | Swiatosz ...................... 165/61 |
| 4,904,090 | A | * | 2/1990 | Oliver .......................... 374/124 |
| 5,456,994 | A | * | 10/1995 | Mita ............................. 429/71 |
| 5,545,966 | A | | 8/1996 | Ramos et al. |
| 5,756,227 | A | * | 5/1998 | Suzuki et al. ................. 429/62 |
| 5,934,079 | A | * | 8/1999 | Han et al. ..................... 62/3.2 |
| 6,294,721 | B1 | * | 9/2001 | Oravetz et al. ............... 136/242 |
| 6,324,058 | B1 | * | 11/2001 | Hsiao ........................... 361/699 |
| 6,651,446 | B1 | * | 11/2003 | Woods .......................... 62/3.7 |
| 6,653,002 | B1 | * | 11/2003 | Parise ............................ 429/7 |
| 2002/0182493 | A1 | | 12/2002 | Ovshinsky et al. |
| 2003/0134189 | A1 | * | 7/2003 | Kanai et al. .................. 429/156 |

FOREIGN PATENT DOCUMENTS

| | | |
|---|---|---|
| CN | 1465001 | 12/2003 |
| CN | 1479403 | 3/2004 |
| DE | 195 03 085 A1 | 9/1996 |
| EP | 0 814 530 A1 | 12/1997 |
| JP | 08-148189 | 6/1996 |
| JP | 2002-134177 | 5/2002 |
| JP | 2003-100272 | 4/2003 |
| JP | 2004-22496 | 1/2004 |
| KR | 10-2004-0045937 | 6/2004 |
| WO | WO 03/001313 A1 | 1/2003 |

OTHER PUBLICATIONS

English abstract of publication No. CN1479403, dated Mar. 3, 2004, in the name of Omura Kenji et al. listed above.
European Search Report for EP 05 10 8800 mailed Jan. 4, 2006.
Patent Abstracts of Japan, Publication No. 2004-022496; Publication Date: Jan. 22, 2004; in the name of Sakai.
Korean Patent Abstracts, Publication No. 1020040045937; Publication Date: Jun. 5, 2004; in the name of Lee.

* cited by examiner

*Primary Examiner* — Keith Hendricks
*Assistant Examiner* — Bach Dinh
(74) *Attorney, Agent, or Firm* — Christie, Parker & Hale, LLP

(57) ABSTRACT

A system which can efficiently control the temperature of the battery module, and also can easily control the temperature in the intense environment by actively adapting the exterior environment. The system for controlling temperature of a secondary battery module includes a housing receiving a plurality of unit batteries. The housing has an inlet and an outlet. A heat transfer member is in contact with the unit batteries. The heat transfer member has a portion exposed to a heat transfer medium duct formed inside the housing, and a temperature controller is mounted in the heat transfer member to control temperature of the unit batteries.

24 Claims, 3 Drawing Sheets

SYSTEM FOR CONTROLLING TEMPERATURE OF A SECONDARY BATTERY MODULE

CROSS-REFERENCE TO RELATED APPLICATION

This application claims priority to and the benefit of Korean Patent Application No. 10-2004-0076439 filed on Sep. 23, 2004 in the Korean Intellectual Property Office, the entire disclosure of which is incorporated herein by reference.

FIELD OF THE INVENTION

The present invention relates to a secondary battery, and more particularly, to a system for controlling temperature of a secondary battery module in which the battery module is formed by connecting unit batteries.

BACKGROUND OF THE INVENTION

Non-aqueous electrolyte secondary batteries of high energy density have recently been developed as high power secondary batteries, and bulk size batteries are formed by serially connecting several to tens of the high power secondary batteries to be suitable for machine motor drives requiring high power sources, such as hybrid electric vehicles.

Such a bulk size secondary battery assembly ("battery module") typically includes multiple secondary batteries (each individual secondary battery being deemed a "unit battery") serially connected to each other.

If the unit batteries are square type batteries, the unit batteries are arranged to alternate positive and negative terminals of one unit battery with the positive and negative terminals of an adjacent unit battery. Adaptors of the electric conductor are typically mounted on threaded negative and positive terminals such that they are electrically connected with each other to form the battery module.

Since the battery module connects several to tens of unit batteries to form one battery module, there is a need to efficiently emit heat generated from each unit battery. In particular, when the unit battery is used as bulk size secondary batteries for motor drive such as electric vehicles or hybrid electric vehicles, motor scooters, and vacuum cleaners, the heat emission is of significant importance.

If the heat emission does not occur properly, the temperature of the battery module may excessively increase due to the heat generated from each unit battery, and accordingly, not only the battery module but also machines with the battery module, can malfunction.

The heat emission becomes particularly critical for battery modules used for motor drive, since high current charge and discharge occurs in each unit battery.

There have been efforts to solve the heat emission problem by use of thermoelectric elements, wherein a Nickel metal hydride battery is used as a unit battery and the unit battery is used to form a battery module. However, when thermoelectric elements are applied to the battery module in the above conventional art, their geometric configuration has not been considered, and they have been simply mounted on some portion of the battery module. Accordingly, the satisfactory cooling efficiency of the battery module has not yet been achieved.

SUMMARY OF THE INVENTION

In accordance with the present invention a system for controlling temperature of a secondary battery module is provided which can efficiently control the temperature of the battery module, actively respond to the exterior environment even in an intense environment, and which can minimize the size by simplifying the structure.

In one aspect of the present invention a system for controlling temperature of a secondary battery module according to the present invention includes: a housing adapted to receive a plurality of unit batteries, the housing having an inlet and an outlet; a heat transfer member in contact with the unit batteries, the heat transfer member having a portion to be exposed to a heat transfer medium duct formed inside the housing; and a temperature controller mounted in the heat transfer member to control temperature of the unit batteries. Accordingly, the temperature of the battery can be increased or decreased by heating energy or cooling energy of the temperature controller transferred through the heat transfer member.

In another aspect of the present invention, a system for controlling temperature of a secondary battery module according to another embodiment of the present invention includes: a housing receiving a unit battery, the housing having an inlet and an outlet; and a temperature controller controls temperature of the heat transfer medium flowing into the housing. Since the temperature of the cooling medium which flows into the housing can be properly controlled by the temperature controller, the temperature of the unit battery can be easily controlled.

In exemplary embodiments the temperature controller has thermoelectric elements, wherein a thermoelectric element has a cooling surface where cooling occurs, and a heating surface where heating occurs spontaneously according to the current direction. At least one surface of the cooling surface and the heating surface can be attached on the outer surface of a heat transfer medium.

In exemplary embodiments, a thermoelectric cooling element and a thermoelectric heating element can be selectively used as the thermoelectric element and separately mounted. The thermoelectric cooling element works when cooling the unit battery and the thermoelectric heating element works when increasing temperature of the unit battery.

In exemplary embodiments the temperature controller is connected to temperature sensors and applies to the thermoelectric elements output signals in response to the detected temperature to selectively perform endothermic or exothermic reaction.

In exemplary embodiments temperature sensors can be mounted inside the housing to detect the temperature of the unit battery. The temperature sensors can be mounted on each of the unit batteries and independently detect the temperature of each of the unit batteries.

In exemplary embodiments the thermoelectric element may be located in a cooling medium duct of the housing to cool the heating surface, and a cooling fan can be further provided in the heating surface in the case that the thermoelectric element is the thermoelectric cooling element.

In exemplary embodiments, a heat dissipation member can be connected to an inlet and the thermoelectric elements can be mounted on a heat dissipation member. The heat dissipation member may have a bottom plate where the thermoelectric element is attached, and plural fins mounted in the bottom plate being spaced apart at a predetermined distance. Accordingly, the cooling medium passing through the inlet can contact broader area due to the bottom plate and plural fins so that the heat energy from the thermoelectric element can be supplied more effectively.

In exemplary embodiments, the heat transfer member may have a heat sink or a heat pipe, or it can have a structure which surrounds the unit batteries. One end of the heat sink or the heat pipe can be located in the cooling medium duct of the housing to transfer the heat to the cooling medium.

In exemplary embodiments the cooling medium can be air. The air can be supplied by air cooling system which uses the environmental atmosphere as temperature controlling air. The air can be also be provided by a vehicle's air conditioning system.

Such structures accomplish heat transfer from the unit battery by the cooling medium flowing into the housing through the heat sink or the heat pipe of the heat transfer medium, and also controls the temperature appropriately by the thermoelectric element which performs endothermic or exothermic reaction according to the temperature of the unit battery to maintain the battery module in good condition.

DETAILED DESCRIPTION

In the following embodiments, the system for controlling temperature of a secondary battery module adopts an air cooling system which uses exterior air as a coolant. However, the present invention is not limited to the following structure, and can be applied to the way it uses a vehicle's air conditioning system besides an air cooling system.

Figure 1:
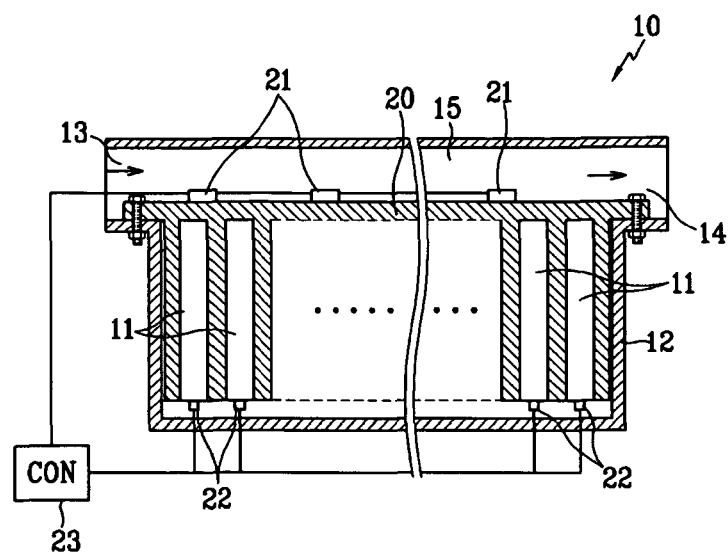
FIG. 1 is a schematic cross-sectional side view of a system for controlling temperature of a secondary battery module according to a first embodiment of the present invention.

FIG. 1 is a schematic cross-sectional side view of a system for controlling the temperature of a secondary battery module (hereinafter "the system") according to the first embodiment of the present invention. The battery module 10 of the system includes multiple unit batteries 11, each having an electrode assembly having a positive plate, a negative plate, and a separator interposed between the positive plate and the negative plate to generate unit power, and a housing 12 receiving the unit batteries 11 which are spaced apart at a predetermined distance. Each of the unit batteries 11 of the present exemplary embodiment may be a lithium type secondary battery, such as a lithium-ion battery.

The housing 12 has an inlet 13 formed on one side thereof to allow air for controlling the temperature of the unit batteries 11 to flow in and an outlet 14 formed on the other side thereof to allow the air passing through the unit batteries 11 to flow out. An air duct 15 is formed between the inlet 13 and the outlet 14 inside the housing 12.

In accordance with the present invention, the shape of the housing 12, the location of the inlet 13 and the outlet 14 inside the housing 12, and the array structure of the unit batteries 11 inside the housing 12 are not limited so long as they meet the above general structure.

The first exemplary embodiment will be described based on the structure shown in FIG. 1, wherein the inlet 13 and the outlet 14 are formed in an upper portion of the housing 12.

The system includes a heat sink 20 extending along the air duct 15 and contacting closely with the outer surface of the unit batteries 11 inside the housing 12. Multiple thermoelectric elements 21 are mounted on the heat sink 20 and are located in the air duct 15. Temperature sensors 22 are mounted on one side of respective unit batteries 11 to detect the temperature of the respective unit batteries 11. A controller 23 is connected to the temperature sensors 22 and is adapted to apply an output signal to the thermoelectric elements 21 in response to the detected temperatures of the unit batteries 11. Those skilled in the art can appreciate that controller 23 can, for example, control the cooling of one or more of the unit batteries, that is, each unit battery has a temperature set for itself and its temperature is controlled by the controller, or, alternatively, there is one overall temperature specified for the entire battery module and individual sensor readings are measured against the overall temperature such that each of the unit batteries are appropriately adjusted so that the overall battery module temperature is maintained.

The system with the above structure can control the temperature of the module when it is used as power source to drive machine motors, such as those used in hybrid electric vehicles. If heat is generated from the unit batteries 11, the heat is transferred toward the air duct 15 along heat sink 20 which functions as a heat transfer medium. Then, air is provided into inlet 13 and flowing through air duct 15 can cool the heat conducted toward the air duct 15. Alternatively, the air can be provided directly toward the unit batteries 11 to cool the unit batteries 11.

In addition, thermoelectric elements 21 in response to the control signal provided by the controller 23 work at the surface of heat sink 20 so that the system can perform cooling more efficiently. That is, the temperature sensors 22 mounted in the unit batteries 11 detect the temperature of the unit batteries 11 in real time. The detected signal is transferred to the controller 23, and if the controller 23 decides that it is necessary to cool one or more of the unit batteries 11, it sends control signals to the thermoelectric elements 21 to drive the respective thermoelectric elements 21.

The thermoelectric elements 21 are elements which perform exothermic reaction or endothermic reaction by use of hetero-metal or semiconductor, but are not limited to just these types. For example, an individual one of the thermoelectric elements 21 can be an element which uses a cooling effect generated by combining bipolar semiconductors.

In the first exemplary embodiment, the thermoelectric elements 21 have a structure such that they each can absorb, together with the heat sink 20, the heat transferred to the heat sink 20 and allow the heat generated from the unit batteries 11 to be dissipated.

It should be noted that it is not necessary that the thermoelectric elements 21 have a structure that performs merely endothermic reaction. Sometimes, the thermoelectric elements 21 can have a structure which performs exothermic reaction. That is, if necessary, in an atmosphere requiring an increase in the temperature of the unit batteries 11 (such as in an intense cold environment), the thermoelectric elements 21 perform exothermic reaction in response to the temperature sensors 22 and the controller 23 such that the temperature of the unit batteries 11 increase, which enables the unit batteries 11 to work smoothly. In that case, the heat sink 20 can also function as a heat transfer member.

The temperature sensors 22 can be separately mounted corresponding to each of the unit batteries 11. The mounting location is not limited to a certain location as far as it can detect correctly the temperature of the respective unit batteries 11.

Furthermore, the thermoelectric elements 21 arranged on the heat sink 20 are typically spaced apart at a predetermined distance, and the number of theremoelectric elements 21 can be varied according to the size of the battery module 10.

The heat sink 20 can alternatively be another type heat transfer member, such as a heat pipe.

The following will now describe in more detail how the system with the above structure operates. Forced air supplied to the housing 12 through a ventilator (not shown) flows inside the housing 12 through the inlet 13 of the housing 12, moves along the air duct 15 defined by the heat sink 20 and the housing 12, and flows outside the housing 12 through the outlet 14 formed in the housing 12. In this process, the heat generated from the unit batteries 11 is transferred toward the air duct 15 through the heat sink 20, and is cooled by the air passing through the air duct 15.

In addition, the temperature sensors 22 mounted on the unit batteries 11 continuously detect the temperature of the unit batteries 11. The detected signals are applied to the controller 23. The controller 23 receives and processes the signals of the temperature sensors 22, such that if the temperature of the batteries 11 increase over a predetermined temperature, it sends output signals to the thermoelectric elements 21 to initiate the functioning of thermoelectric elements 21.

One surface of a thermoelectric element 21, that is, a temperature control electrode (not shown) of the thermoelectric element 21, is in contact with the heat sink 20, and the other surface thereof, that is, an endo/exothermic electrode (not shown) of the thermoelectric element 21, is in contact with the air passing through the air duct 15. Therefore, when the controller 23 provides signals to enable current to flow in the thermoelectric elements 21, the surface in contact with the heat sink 20 through the temperature control electrode is cooled.

The heat of the unit batteries 11 while being dissipated toward the air duct 15 through the heat sink 20 is first cooled by the thermoelectric elements 21 and the endo/exothermic electrode of the thermoelectric element 21, and then is further cooled by the cool air passing through the air duct 15. As such, the system cools the heat sink 20 by the reaction of the thermoelectric elements 21 to increase the final cooling efficiency for the unit batteries 11.

On the other hand, the temperature of the unit batteries 11 can alternatively be increased by the thermoelectric elements 21 if the situation arises. That is, if the current to the thermoelectric element 21 flows in the reverse direction, the temperature control electrode heats the heat sink 20, and the endo/exothermic electrode absorbs the heat around the air duct 15, and thereby the heat transferred through the heat sink 20 increases the temperature of the unit batteries 11.

Figure 2:
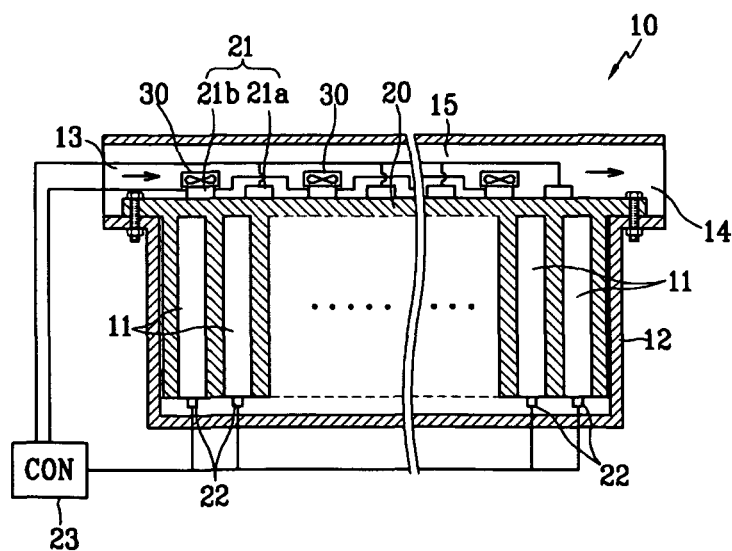
FIG. 2 is a schematic cross-sectional side view of a system for controlling temperature of a secondary battery module according to a second embodiment of the present invention.

Now referring to FIG. 2, a second embodiment of the present invention is described. In this exemplary embodiment, the thermoelectric elements 21 mounted on the heat sink 20 each have a thermoelectric heating element 21*a* for heating the heat sink 20 and a thermoelectric cooling element 21*b* for cooling the heat sink 20 which are separated mounted. That is, in this exemplary embodiment, the thermoelectric element for increasing the temperature of the unit batteries 11 and the thermoelectric element for cooling the temperature of the unit batteries 11 are separated for their respective heating and cooling purposes.

Such a structure can enhance the battery module lifetime which otherwise would be diminished by overwork of the thermoelectric elements when one thermoelectric element alternatively performs both the heating and the cooling of the unit batteries 11. That is, if the cooling thermoelectric element and the heating thermoelectric element for the unit batteries are separately provided as described for second embodiment, each thermoelectric element performs only one function to advantageously extend the lifetime, and therefore, results in the system having an overall endurance improvement.

In an exemplary embodiment thermoelectric heating elements 21*a* and thermoelectric cooling elements 21*b* are alternately arranged along the air duct 15.

In addition, the system can further include additional cooling means, such as cooling fans 30 directed toward the outer surface, i.e. the heating surface of the thermoelectric cooling element 21*b* facing the air duct 15, to increase the cooling efficiency for the unit batteries 11. That is, the cooling fans 30 further cool the heat dissipated from the region near the heating surface and the heat sink 20 around the heating surface, and thereby, the cooling efficiency for the unit batteries 11 provided by the thermoelectric elements 21*b* can be further increased.

The cooling fans 30 may be located in the air duct 15 such that the cooling fans 30 transfer heat of the thermoelectric element to the air flowing along the air duct, thereby allowing the heat to be easily dissipated.

Figure 3:
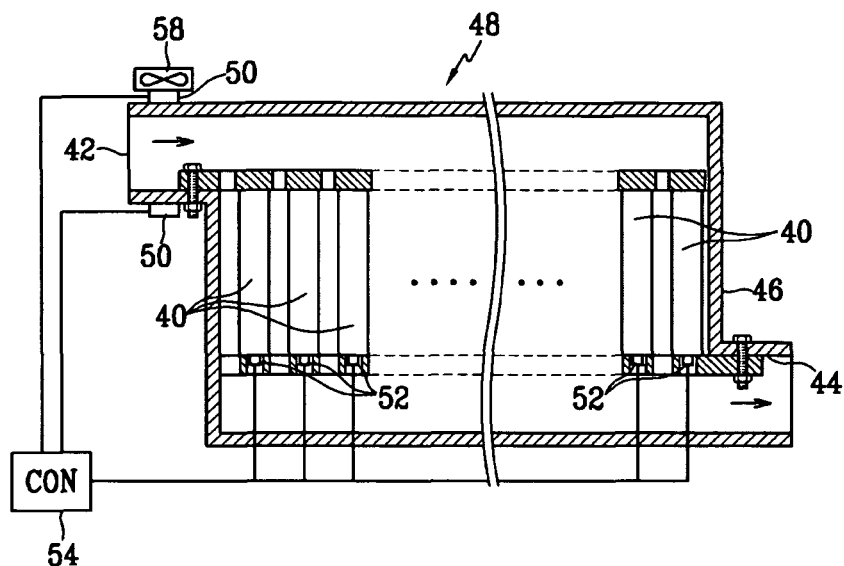
FIG. 3 is a schematic cross-sectional side view of a system for controlling temperature of a secondary battery module according to a third embodiment of the present invention.

FIG. 3 shows a system according to the third embodiment of the present invention. The battery module 48 of the system includes unit batteries 40, each with an electrode assembly having a positive plate, a negative plate, and a separator interposed between the positive plate and the negative plate to generate unit power. A housing 46 has an inlet 42 for receiving a temperature controlling air formed on one side thereof to control the temperature of the unit batteries 40, and an outlet 44 for discharging the air passing through the unit batteries 40 formed on the other side facing the one side. The unit batteries 40 are arranged and spaced apart at a predetermined distance. The system further includes a thermoelectric elements 50 formed in the inlet 42 of the housing 46 to increase or decrease the temperature of the air flowing inside the housing 46 through the inlet 42.

Also, the system includes temperature sensors 52 mounted on one side of the respective unit batteries 40 to detect the temperatures of the unit batteries 40, and a controller 54 connected to the temperature sensors 52 to apply output signals to the thermoelectric elements 50 in response to the detected temperatures of the unit batteries 40.

In the system of the exemplary third embodiment the thermoelectric elements 50 receiving the signals output from the controller 54 perform exothermic reaction or endothermic reaction according to the output signals to heat or cool the region of the housing 46 adjacent to the inlet 42, and therefore, the temperature of the air passing through the inlet 42 is increased or decreased. Accordingly, the air passing through the unit batteries 40 inside the housing 46 from the inlet 42 can heat or cool the unit batteries 40 to control the temperature.

The system of the third exemplary embodiment can therefore appropriately control the temperature of the air (the exterior air flowing into the housing from the outside of the housing) which passes through the unit batteries 40 for maintaining the temperature of the unit batteries 40, such that it can use the exterior air as the temperature controlling air regardless of the exterior environment of the battery module 48.

Figure 4:
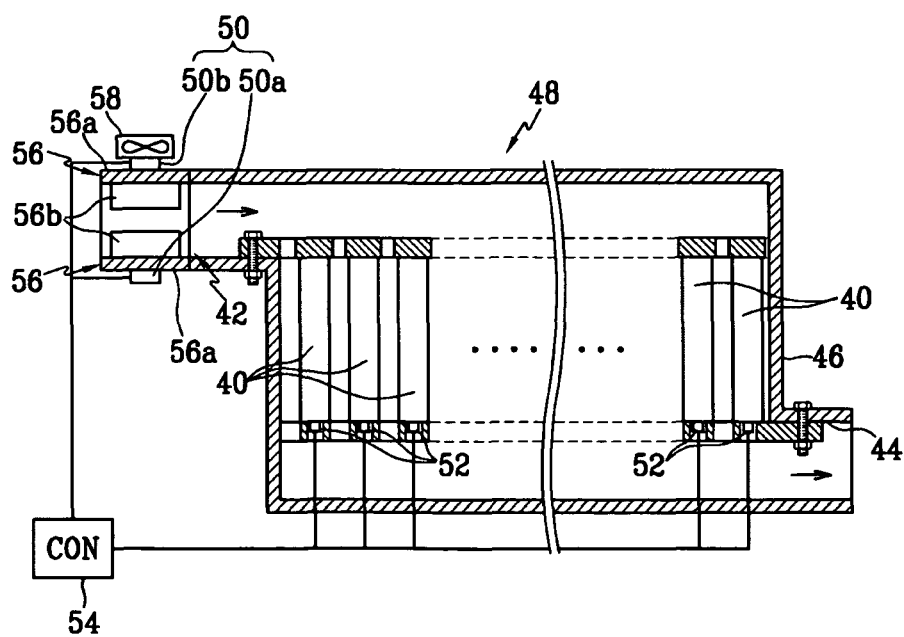
FIG. 4 is a schematic cross-sectional side view of a system for controlling temperature of a secondary battery module according to a fourth embodiment of the present invention.

Referring to now FIG. 4, the system shown in FIG. 3 can additionally have, in a fourth exemplary embodiment, a heat dissipation member 56 for transferring heat or coolness generated from the thermoelectric element 50 in the inlet 42 of the housing 46 to control the air temperature more efficiently.

The heat dissipation member 56 has a bottom plate 56*a* with a predetermined shape and size, and multiple fins 56*b* integrated with the bottom plate 56a and spaced apart at a predetermined distance. The thermoelectric element 50 is mounted in contact with the bottom plate 56a being opposite to the fins 56b.

In this fourth exemplary embodiment, the thermoelectric elements 50 heat or cool the heat dissipation member 56 to heat or cool the air passing through the inlet 42 after crossing the heat dissipation member 56. Then, while the air crosses the heat dissipation member 56, it can contact the fins 56b in a broader area to increase the heating or cooling efficiency of the thermoelectric elements 50.

The thermoelectric elements 50 can be separated into a thermoelectric heating element 50a and a thermoelectric cooling element 50b to increase the efficiency, in a similar fashion to that of the embodiment depicted in FIG. 2. The thermoelectric heating element 50a accomplishes an increase in the temperature of the air flowing into the housing 46 by heating the heat dissipation members 56 or the region of the housing 46 adjacent to the inlet 42, while the thermoelectric cooling element 50b accomplishes a decrease in the temperature of the air flowing into the housing 46 by heating the heat dissipation members 56 or the region of the housing 46 adjacent to the inlet 42.

In one exemplary embodiment the thermoelectric heating element 50a and the thermoelectric cooling element 50b are alternately arranged on the heat dissipation members 56 or the region of the housing 46 adjacent to the inlet 42. When they are arranged on the heat dissipation member 56, the heat dissipation members can be integrated to be commonly used or can be separately provided to be independently used.

In addition, the system of the exemplary fourth embodiment depicted in FIG. 4 (as well as the system of the third embodiment, as depicted in FIG. 3) can further include a cooling fan 58 facing the thermoelectric cooling element 50b, on the heating surface of the housing 46. The cooling fan 58 further decreases the cooling temperature of the thermoelectric cooling element 50b to cool the heat generated from the heating surface of the thermoelectric cooling element 50b. The cooling fan 58 is exposed to the atmosphere to emit the heat generated from the cooling fan 58 into air.

Although the heat dissipation member 56 is described to be arranged outside the housing 46 to connect with the region of the inlet 42, it can also have a structure which is mounted inside the inlet 42 within the housing 46.

The following will now describe in more detail how the system depicted in FIGS. 3 and 4 operate. An air supplied to the housing 46 through a ventilator (not shown) flows inside the housing 46 through the inlet 42 of the housing 46, and passes between the unit batteries 40 to accomplish heat transfer, and flows out of the housing 46 through the outlet 44 formed in the housing 46. In this process, the heat generated from the unit batteries 40 is cooled by the air passing through the unit batteries 40.

In addition, the temperature sensors 52 mounted in the unit batteries 40 continuously detect the temperature of the unit batteries 40, and the detected signals are applied to the controller 54. The controller 54 is responsive to the signals of the temperature sensors 52, and if the temperature of the unit batteries 40 increases over the predetermined temperature, it sends the output signal into the thermoelectric elements 50 to initiate the operation of the thermoelectric elements 50.

For example, in the case that the air is to be cooled by the thermoelectric element 50, current is applied into the thermoelectric elements 50 and through the operation of the thermoelectric elements 50 as described previously, the endothermic reaction of the thermoelectric elements 50 cools their temperature control electrodes, and thereby the bottom plate 56a and the fins 56b of the heat dissipation members 56 are cooled. Accordingly, the air passing through the heat dissipation members 56 of FIG. 4 is cooled by the cooling air emitted from the heat dissipation members 56, and then the cooled air decreases the temperature of the unit batteries 40 when passing through the housing 46.

In the embodiments of FIGS. 3 and 4 the cooling fan 58 works at the side of the outer heating surface of the thermoelectric elements 50, that is, endo/exothermic electrode (not shown) of the thermoelectric elements 50, to emit heat generated from the endo/exothermic electrode into the atmosphere. Accordingly, the temperature of the heating surface of the thermoelectric elements 50 is decreased to increase the cooling efficiency of the thermoelectric elements 50.

On the other hand, if the temperature of the unit batteries 40 is less than the predetermined temperature, the controller 54 makes the current to the thermoelectric elements 50 flow in the reverse direction, and thereby the temperature of the air passing through housing 46, and in FIG. 4 the heat dissipation members 56, can be increased. That is, for the fourth embodiment of FIG. 4, as the surface of the thermoelectric elements 50 in contact with the bottom plates 56a are heated, the thermoelectric elements 50 transfer the generated heat through the bottom plates 56a and the fins 56b into the air passing through the heat dissipation members 56 to heat the air, and the heated air heats the unit batteries 40 as it passes through the housing 46.

Figure 5:
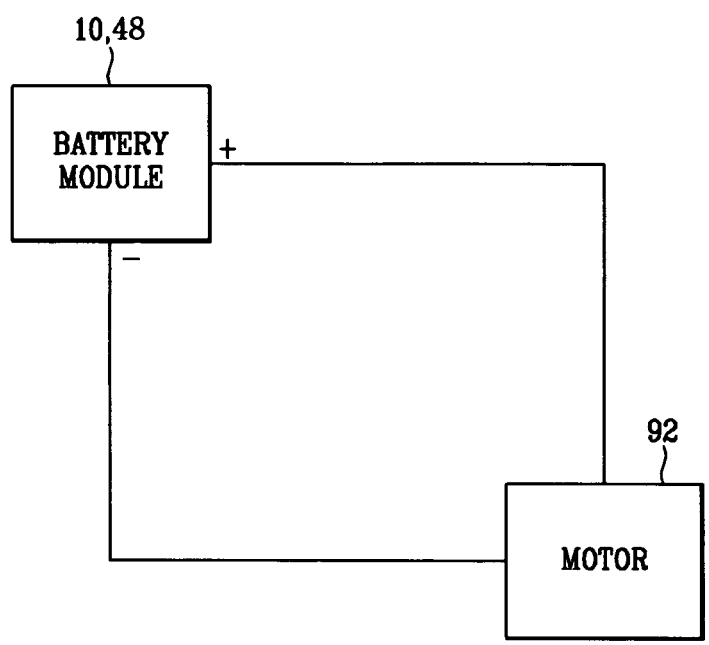
FIG. 5 is a schematic block diagram showing a secondary battery module driving a motor according to an embodiment of the present invention.

FIG. 5 is a schematic block diagram of a secondary battery module 10, 48 as discussed in FIGS. 1 to 4 driving a motor 92.

Though the system for controlling temperature of a secondary battery module of the present invention can be effectively used as batteries for hybrid electric vehicles (HEVs) which require high power and bulk size, its use is not limited only to HEVs. The system can also be used as other battery modules, including other motor driven battery modules for electric vehicles, motor scooters, motorbikes, and vacuum cleaners.

According to the exemplary embodiments of the present invention, the system is able to actively control the temperature of the battery module by temperature control of the heat transfer member and the thermoelectric element.

In addition, since the system has a simple structure, it can be easily applied to both the air cooling system and the vehicle's air conditioning system.

Moreover, since the battery module in itself can actively respond to intense environments, it can have wider range of application and higher reliability.

Although exemplary embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A system for controlling temperature of a secondary battery module comprising a plurality of unit batteries, the system comprising:

a housing containing the plurality of unit batteries to be spaced from each other in a first direction, the housing having an inlet, an outlet, and a heat transfer medium duct extending in the first direction from the inlet to the outlet;

a heat transfer member in contact with the plurality of unit batteries, the heat transfer member comprising a first portion having a first surface exposed to the heat transfer medium duct and a second surface opposite the first surface and contacting outer surfaces of the unit batteries, and a plurality of second portions each protruding from the second surface of the first portion and extending between a respective pair of adjacent unit batteries of the plurality of unit batteries and substantially surrounding surfaces of the adjacent unit batteries facing each other; and a temperature controller adapted to control temperature of the unit batteries, wherein the temperature controller comprises a plurality of thermoelectric elements each comprising a first surface in contact with the heat transfer member and a second surface exposed in the heat transfer medium duct, the first surfaces of the thermoelectric elements being spaced apart from one another in the first direction, and the second surfaces of the thermoelectric elements being spaced apart from one another in the first direction.

2. The system of claim 1, wherein the heat transfer member comprises a heat sink.

3. The system of claim 2, wherein the heat sink surrounds the unit batteries.

4. The system of claim 1, wherein a cooling fan is mounted at the another surface of at least one thermoelectric element of the plurality of thermoelectric elements.

5. The system of claim 1, further comprising temperature sensors inside the housing for detecting temperature of the unit batteries.

6. The system of claim 1, further comprising individual temperature sensors mounted on respective ones of the unit batteries to detect temperatures of the respective ones of the unit batteries.

7. The system of claim 1, wherein at least one thermoelectric element of the plurality of thermoelectric elements is connected to at least one temperature sensor detecting temperature of at least one respective one of the unit batteries and adapted to apply an output signal to the at least one thermoelectric element in response to the temperature detected by the at least one temperature sensor for selectively performing at least one of an endothermic reaction or an exothermic reaction.

8. The system of claim 1, wherein the heat transfer medium duct is a flow channel for air.

9. The system of claim 8, wherein at least one fan is provided in the heat transfer medium duct to ventilate the air.

10. The system of claim 1, wherein the battery module is a motor drive battery module.

11. The system of claim 1, wherein a unit battery of the plurality of unit batteries is a lithium type battery.

12. A system for controlling temperature of a secondary battery module comprising a plurality of unit batteries, the system comprising:

a housing containing the plurality of unit batteries to be spaced from each other in a first direction, the housing having an inlet, an outlet, and a heat transfer medium duct extending in the first direction from the inlet to the outlet;

a heat transfer member in contact with the plurality of unit batteries, the heat transfer member comprising a first portion having a first surface exposed to the heat transfer medium duct and a second surface opposite the first surface and contacting outer surfaces of the unit batteries, and a plurality of second portions each protruding from the second surface of the first portion and extending between a respective pair of adjacent unit batteries of the plurality of unit batteries and substantially surrounding surfaces of the adjacent unit batteries facing each other; and a plurality of thermoelectric elements on the heat transfer member for controlling temperature of the plurality of unit batteries and each comprising a first surface in contact with the heat transfer member and a second surface exposed in the heat transfer medium duct, the first surfaces of the thermoelectric elements being spaced apart from one another in the first direction, and the second surfaces of the thermoelectric elements being spaced apart from one another in the first direction, the thermoelectric elements comprising at least one of a thermoelectric cooling element or a thermoelectric heating element.

13. The system of claim 12, wherein the heat transfer member comprises a heat sink.

14. The system of claim 13, wherein the heat sink surrounds the unit batteries.

15. The system of claim 12, wherein the thermoelectric elements comprise both a thermoelectric cooling element and a thermoelectric heating element.

16. The system of claim 15, wherein the thermoelectric cooling element and the thermoelectric heating element are alternately arranged and spaced apart.

17. The system of claim 16, further comprising at least one cooling fan in the heat transfer medium duct at the thermoelectric cooling element.

18. The system of claim 12, further comprising temperature sensors inside the housing for detecting temperatures of respective unit batteries of the plurality of unit batteries.

19. The system of claim 18, further comprising a controller connected to each of the temperature sensors and adapted to apply output signals to the thermoelectric elements in response to the temperatures detected by each of the temperature sensors for performing at least one of an endothermic reaction or an exothermic reaction.

20. The system of claim 12, further comprising individual temperature sensors mounted on respective ones of the unit batteries to detect temperatures of the respective ones of the unit batteries.

21. The system of claim 12, wherein the heat transfer medium duct channels a flow of air along the portion of the heat transfer member exposed to the heat transfer medium duct.

22. The system of claim 21, further comprising at least one fan in the heat transfer medium duct for moving the air.

23. The system of claim 12, wherein the battery module is a motor drive battery module.

24. The system of claim 12, wherein a unit battery of the plurality of unit batteries is a lithium type battery.

* * * * *